(12) United States Patent
Ye

(10) Patent No.: US 8,832,824 B2
(45) Date of Patent: Sep. 9, 2014

(54) ELECTRONIC DEVICE AND SWITCHING METHOD USING THE SAME

(75) Inventor: Cheng Ye, Shenzhen (CN)

(73) Assignees: Shenzhen Futaihong Precision Industry Co., Ltd., Shenzhen (CN); Chi Mei Communication Systems, Inc., New Taipei (TW)

(*) Notice: Subject to any disclaimer, the term of this patent is extended or adjusted under 35 U.S.C. 154(b) by 0 days.

(21) Appl. No.: 13/620,349

(22) Filed: Sep. 14, 2012

(65) Prior Publication Data
US 2013/0254876 A1 Sep. 26, 2013

(30) Foreign Application Priority Data
Mar. 23, 2012 (CN) .......................... 2012 1 0079364

(51) Int. Cl.
*G06F 21/34* (2013.01)
*G06F 21/00* (2013.01)
*H04R 1/10* (2006.01)

(52) U.S. Cl.
CPC . *G06F 21/00* (2013.01); *H04R 1/10* (2013.01)
USPC ................ 726/19; 726/20; 455/411; 381/74; 348/211.4

(58) Field of Classification Search
None
See application file for complete search history.

(56) References Cited

U.S. PATENT DOCUMENTS

| | | | | |
|---|---|---|---|---|
| 2003/0188201 | A1* | 10/2003 | Venkataramappa | 713/202 |
| 2006/0217985 | A1* | 9/2006 | Noguchi et al. | 704/270 |
| 2009/0158406 | A1* | 6/2009 | Jancula et al. | 726/5 |
| 2012/0021724 | A1* | 1/2012 | Olsen et al. | 455/411 |
| 2012/0189134 | A1* | 7/2012 | Wang et al. | 381/74 |
| 2013/0044231 | A1* | 2/2013 | Chuang et al. | 348/211.4 |
| 2013/0183939 | A1* | 7/2013 | Kakehi | 455/411 |

* cited by examiner

*Primary Examiner* — Jung Kim
*Assistant Examiner* — Janusz Kusyk
(74) *Attorney, Agent, or Firm* — Novak Druce Connolly Bove + Quigg LLP

(57) ABSTRACT

In a switching method of an electronic device, the electronic device receives a message sent from an earphone that is in electronic connection with the electronic device, the message comprising an input password, if the input password is equal to a password to switch an application layer into a host mode, the electronic device switches the application layer into the host mode to access private information of the application layer.

15 Claims, 3 Drawing Sheets

ELECTRONIC DEVICE AND SWITCHING METHOD USING THE SAME

BACKGROUND

1. Technical Field

Embodiments of the present disclosure relate to switching methods, and more particularly to an electronic device and a switching method using the electronic device.

2. Description of Related Art

Users of an electronic device (e.g., a mobile phone) may store private information, such as photos, contact information, in the mobile phone. Users usually set a password to prevent private information from being accessed by others. When a user wants to access the private information, a password is often used to unlock the mobile phone to access the private information. However, it is inconvenient to input the password repeatedly when access to different private information is needed. What is needed, therefore, is an electronic device and a switching method to overcome aforementioned problems.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
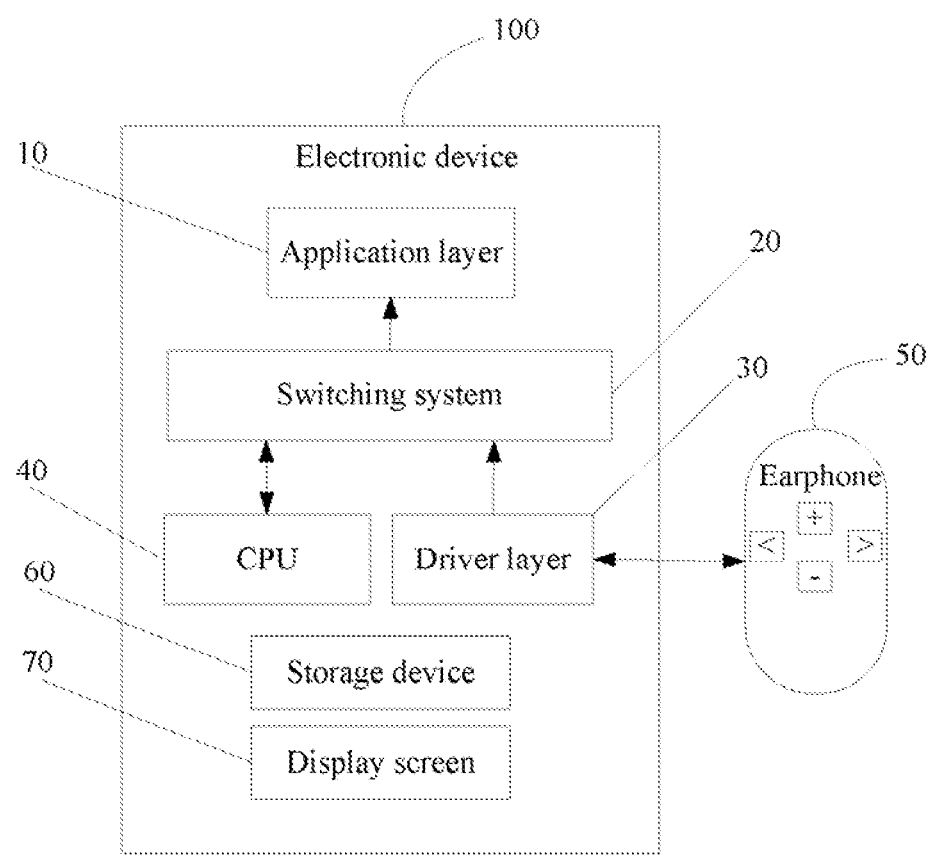
FIG. 1 is a schematic diagram of one embodiment of an electronic device.

FIG. 1 is a schematic diagram of one embodiment of an electronic device 100 including a switching system 20. The electronic device 100 further includes an application layer 10, a driver layer 30, at least one central processing unit (CPU) 40, a storage device 60, and a display screen 70. The electronic device 100 may be a mobile phone, a personal digital assistant (PDA), or other computing device.

The application layer 10 is a layer of the electronic device 100 that comprises applications of the electronic device 100. The application layer 10, for example, may comprise a short message service (SMS) program, a contact management program, an email client, and a file management program. In some embodiments, the above mentioned programs and other programs or applications may include private information, which may be accessed in the application layer 10. In some embodiments, the switching system 20 presets a plurality of modes of the application layer 10, such as a host mode and a guest mode, for example. When the application layer 10 is in the host mode, the private information can be accessed. When the application layer 10 is in the guest mode, the private information cannot be accessed.

The display screen 70 may display information of the application layer 10.

An earphone 50 may be in electronic connection with the electronic device 100 to transmit relevant data. The driver layer 30 monitors status of the earphone 50, and sends a message to the switching system 20 when the status of the earphone 50 is changed. For example, if the earphone 50 is disconnected with the electronic device 100, the driver layer 30 sends a message including a disconnection signal to the switching system 20. The earphone 50 may be a wired earphone or a wireless earphone, which includes a control panel. In one embodiment, the control panel includes a plurality of control keys such as up and down volume keys, left and right arrow keys, for example.

The switching system 20 may automatically switch the predetermined modes of the application layer 10. For example, the switching system 20 switches the application layer 10 into the host mode according to a predetermined message sent from the driver layer 30. Further details will be explained below.

The storage device 60 stores a plurality of preset passwords, the preset passwords may include, but are not limited to a first password to switch the application layer 10 into the host mode to access private information, a second password to reset the first password, a third password to set an email address, and a fourth password to retrieve the preset passwords. In one embodiment, the preset passwords may be input by using the arrow keys and/or the volume keys of the control panel of the earphone 50. For example, when a user clicks the left arrow key one time, and clicks the right arrow key twice, and then clicks the up volume key one time. Then the first password, input through the earphone 50 is generated as "left, right, right, up."

The electronic device 100 is generally controlled and coordinated by an operating system, such as UNIX, LINUX, WINDOWS, MAC OS X, an embedded operating system, or any other compatible operating systems. In other embodiments, the electronic device 100 may be controlled by a proprietary operating system. All such operating systems control and schedule computer processes for execution, perform memory management, provide a file system, networking, and I/O services, and provide a user interface, such as a graphical user interface (GUI), among other things.

Figure 2:
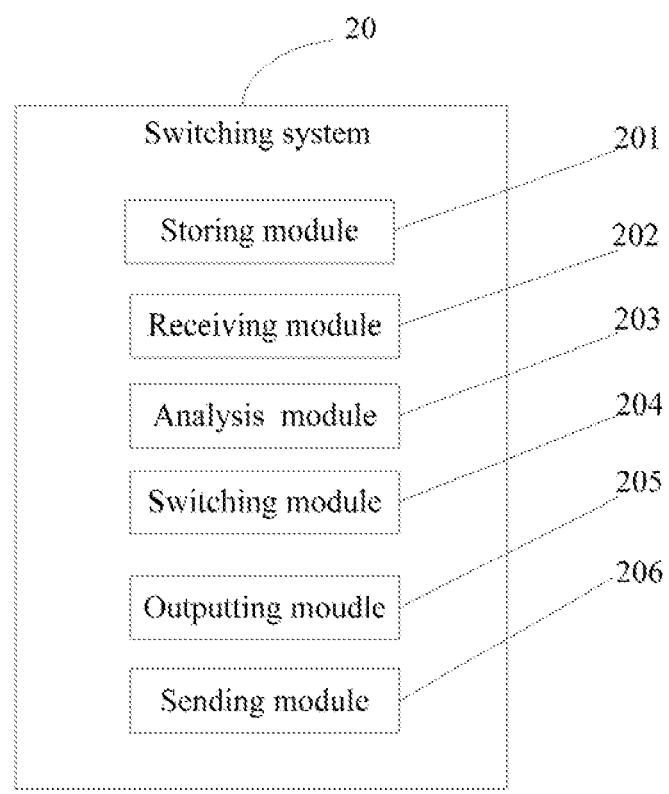
FIG. 2 is a block diagram of function modules of switching system included in the electronic device of FIG. 1.

FIG. 2 is a block diagram of function modules of the switching system 20 in the electronic device 100 of FIG. 1. The switching system 20 may include computerized code in the form of one or more programs that are stored in the storage device 60. The computerized code includes instructions that are executed by the at least one CPU 40 of the electronic device 100. The switching system 20 includes a storing module 201, a receiving module 202, an analysis module 203, a switching module 204, an outputting module 205, and a sending module 206. A description of the switching system 20 follows.

Figure 3:
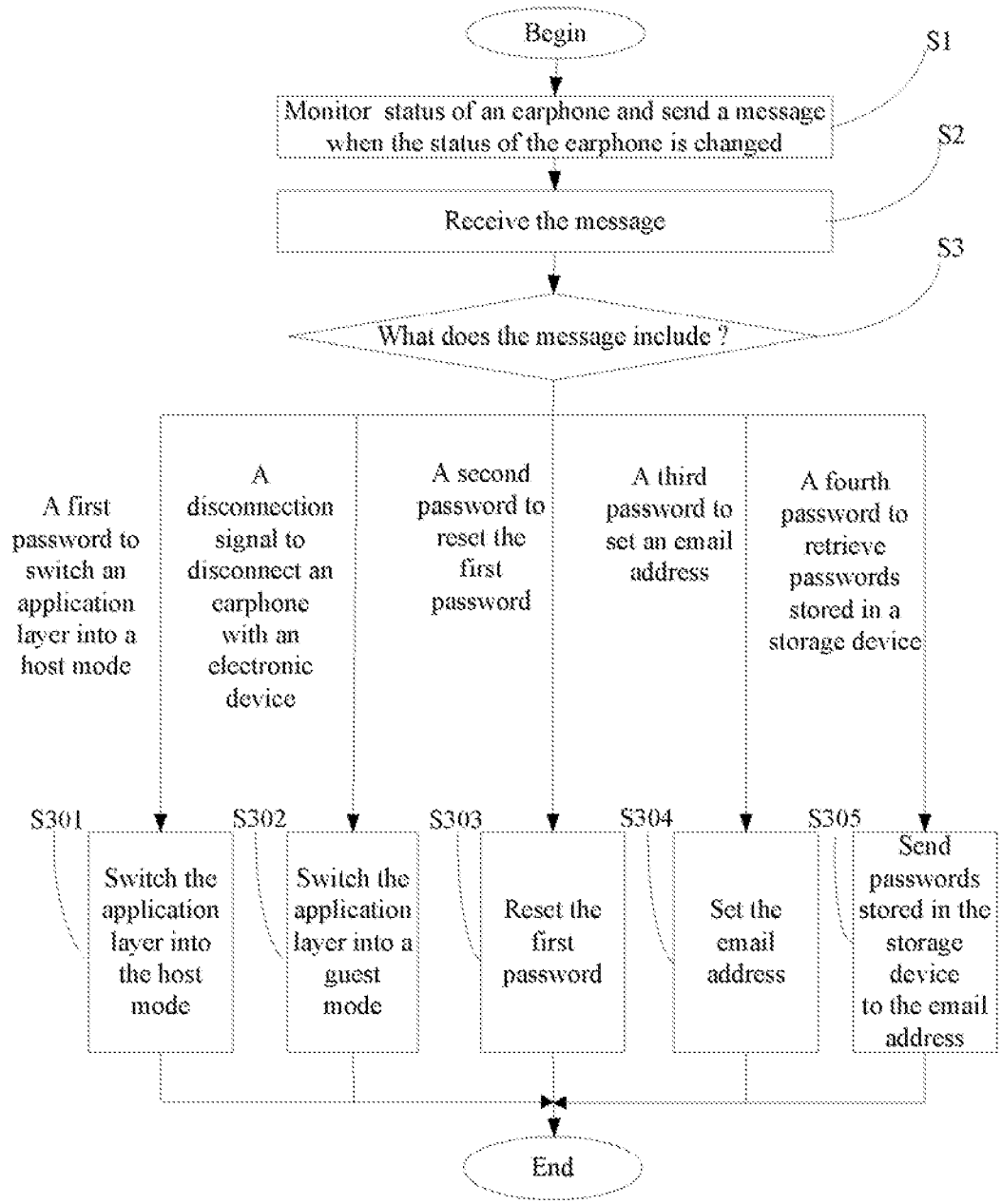
FIG. 3 is a flowchart of one embodiment of a switching method using the electronic device of FIG. 1.

FIG. 3 is a flowchart of one embodiment of a switching method of an electronic device 100. Depending on the embodiment, additional steps may be added, others deleted, and the ordering of the steps may be reset.

In step S1, the driver layer 30 monitors the status of the earphone 50, and sends a message corresponding to the status of the earphone 50 to the switching system 20 when the status of the earphone 50 is changed. For example, if the driver layer 30 receives an input password from the earphone 50, the driver layer 30 sends a message which includes the input password, to the switching system 20. If the drive layer 30 determines that the earphone 50 is disconnected with the electronic device 100, the drive layer 30 sends another message including a disconnection signal to the switching system 20. The disconnection signal is used to disconnect the earphone 50 with the electronic device 100.

In step S2, the receiving module 202 receives the message from the drive layer 30.

In step S3, the analysis module 203 analyzes the message and determines contents of the message.

If the message includes an input password that is equal to the first password to switch the application layer 10 into the host mode, step S301 is implemented.

If the message includes a disconnection signal that indicates that the earphone 50 is disconnected with the electronic device 100, step S302 is implemented.

If the message includes an input password that is equal to a second password to reset the first password, step S303 is implemented.

If the message includes an input password that is equal to a third password to set an email address, step S304 is implemented.

If the message includes an input password that is equal to a fourth password to retrieve passwords stored in the storage device 60, step S305 is implemented.

In step S301, the switching module 204 switches the application layer 10 into the host mode to access the private information. The outputting module 205 invokes an audio interface of the electronic device 100 to output a first preset voice message to the earphone 50 to notify the user that the application layer 10 has been switched into the host mode.

In step S302, the switching module 204 switches the application layer 10 into the guest mode, the private information of the application layer cannot be accessed in the guest mode.

In step S303, the outputting module 205 invokes the audio interface to output a second preset voice message to the earphone 50, to notify the user to input the first password for confirmation. When the user inputs a confirmation password through the earphone 50, the drive layer 30 sends a message including the confirmation password to the switching system 20. The receiving module 202 receives the message including the confirmation password, and the analysis module 203 analyzes the message to determine whether the confirmation password is equal to the first password in the storage device 60.

If the confirmation password is equal to the first password in the storage device, the outputting module 205 outputs a third preset voice message to the earphone 50 to notify the user to input a new password. For example, if the new password is different from the other passwords stored in the storage device 60, the new password is valid, and the outputting module 205 outputs the third preset voice message to notify the user to input the new password a second time.

Similarly, the drive layer 30 sends a message including the new password input the second time to the switching system 20, the receiving module 202 receives the message including the new password input the second time, the analysis module 203 analyzes the message to determine whether the new password inputted the second time is equal to the new password inputted the first time. The storing module 201 replaces the first password with the new password if the new password inputted the second time is equal to the first time. In one embodiment, if any problems occurred during the time of resetting the first password, such as the earphone 50 is disconnected with the electronic device 100, or the new password inputted the second time is not equal to the first time, the process of S303 is ended.

In step S304, the outputting module 205 displays an interface such as a window or a dialog box on a display screen 70 of the electronic device 100 for setting the email address, and the storing module 201 stores the email address to the storage device 60.

In step S305, the sending module 206 sends the preset passwords stored in the storage device 60 to the email address. For example, the preset passwords include the first password, the second password, the third password, and/or the fourth password.

Although embodiments of the present disclosure have been specifically described, the present disclosure is not to be construed as being limited thereto. Various resets or modifications may be made to the present disclosure without departing from the scope and spirit of the present disclosure.

What is claimed is:

1. A switching method of an electronic device, the electronic device comprising an application layer, a driver layer, at least one central processing unit (CPU), and a storage device, the method comprising:
    storing preset passwords in the storage device, the preset passwords being generated by clicking a plurality of control keys on a control panel of an earphone that is connected to the electronic device, the preset passwords comprising a first password to switch the application layer into a host mode, wherein the host mode allows access to private information of the electronic device;
    receiving a first message from the driver layer, the first message comprising an input password sent from the earphone;
    switching the application layer into the host mode when the input password in the first message is equal to the first password in the storage device; and
    outputting a preset voice message to the earphone to notify that the application layer has been switched into the host mode, by invoking an audio interface of the electronic device.

2. The method according to claim 1, further comprising:
    receiving a second message from the driver layer, the second message comprising a disconnection signal to disconnect the earphone with the electronic device; and
    switching the application layer into a guest mode in response to receiving the second message, wherein the private information of the application layer cannot be accessed in the guest mode.

3. The method according to claim 1, further comprising:
    receiving a new password from the driver layer under the condition that the preset passwords comprise a second password to reset the first password and the input password in the first message is equal to the second password in the storage device; and
    replacing the first password with the new password when the new password is valid.

4. The method according to claim 1, further comprising:
    displaying an interface on a display screen of the electronic device and setting an email address in the displayed interface under the condition that the preset passwords comprise a third password to set the email address and the input password in the first message is equal to the third password.

5. The method according to claim 4, further comprising:
    sending the preset passwords to the email address when the input password in the first message is equal to a fourth password prestored in the storage device, the fourth password used to retrieve the preset passwords in the storage device, the preset passwords comprising the first password to switch the application layer into the host mode to access the private information, a second password to reset the first password, the third password to reset the email address, and the fourth password to retrieve the preset passwords.

6. An electronic device, comprising:
an application layer;
a driver layer;
at least one central processing unit (CPU);
a storage device; and
one or more programs that are stored in the storage device and are executed by the at least one CPU, the one or more programs comprising:
a storing module that stores preset passwords in the storage device, the preset passwords being generated by clicking a plurality of control keys on a control panel of an earphone that is connected to the electronic device, the preset passwords comprising a first password to switch the application layer into a host mode, wherein the host mode allows access to private information of the electronic device;
a receiving module that receives a first message from the driver layer, the first message comprising an input password sent from the earphone;
a switching module that switches the application layer into the host mode when the input password in the first message is equal to the first password in the storage device; and
an outputting module that outputs a preset voice message to the earphone to notify that the application layer has been switched into the host mode, by invoking an audio interface of the electronic device.

7. The electronic device according to claim 6, wherein the receiving module further receives a second message from the driver layer, the second message comprising a disconnection signal to disconnect the earphone with the electronic device; and
the switching module further switches the application layer into a guest mode in response to receiving the second message, wherein the private information of the application layer cannot be accessed in the guest mode.

8. The electronic device according to claim 6, wherein the receiving module further receives a new password from the driver layer under the condition that the preset passwords comprise a second password to reset the first password and the input password in the first message is equal to the second password in the storage device; and
the storing module further replaces the first password with the new password when the new password is valid.

9. The electronic device according to claim 6, wherein the outputting module further displays an interface on a display screen of the electronic device to set an email address under the condition that the preset passwords comprise a third password to set the email address and the input password in the first message is equal to the third password, and
the storing module further stores the email address in the storage device.

10. The electronic device according to claim 9, wherein the electronic device further comprises:
a sending module that sends the preset passwords to the email address when the input password in the first message is equal to a fourth password prestored in the storage device, the fourth password used to retrieve the preset passwords in the storage device, the preset passwords comprising the first password to switch the application layer into the host mode to access the private information, a second password to reset the first password, the third password to reset the email address, and the fourth password to retrieve the preset passwords.

11. A non-transitory storage medium having stored thereon instructions that, when executed by a central processing unit (CPU), causes an electronic device to perform a switching method of the electronic device, the electronic device comprising an application layer, a driver layer, at least one CPU, and a storage device, the method comprising:
storing preset passwords in the storage device, the preset passwords being generated by clicking a plurality of control keys on a control panel of an eamhone that is connected to the electronic device, the preset passwords comprising a first password to switch the application layer into a host mode, wherein the host mode allows access to private information of the electronic device;
receiving a first message from the driver layer, the first message comprising an input password sent from the earphone;
switching the application layer into the host mode when the input password in the first message is equal to the first password in the storage device; and
outputting a preset voice message to the earphone to notify that the application layer has been switched into the host mode, by invoking an audio interface of the electronic device.

12. The non-transitory storage medium according to claim 11, further comprising:
receiving a second message from the driver layer, the second message comprising a disconnection signal to disconnect the earphone with the electronic device; and
switching the application layer into a guest mode in response to receiving the second message, wherein the private information of the application layer cannot be accessed in the guest mode.

13. The non-transitory storage medium according to claim 11, further comprising:
receiving a new password from the driver layer under the condition that the preset passwords comprise a second password to reset the first password and the input password in the first message is equal to the second password in the storage device; and
replacing the first password with the new password when the new password is valid.

14. The non-transitory storage medium according to claim 11, further comprising:
displaying an interface on a display screen of the electronic device and setting an email address in the displayed interface under the condition that the preset passwords comprise a third password to set the email address and the input password in the first message is equal to the third password.

15. The non-transitory storage medium according to claim 14, further comprising:
sending the preset passwords to the email address when the input password in the first message is equal to a fourth password prestored in the storage device, the fourth password used to retrieve the preset passwords in the storage device, the preset passwords comprising the first password to switch the application layer into the host mode to access the private information, a second password to reset the first password, the third password to reset the email address, and the fourth password to retrieve the preset passwords.

* * * * *